United States Patent
Abusamra et al.

(10) Patent No.: US 7,232,021 B2
(45) Date of Patent: Jun. 19, 2007

(54) METHOD AND ASSEMBLY FOR CONTROLLING A CENTRIFUGAL CLUTCH

(75) Inventors: Muneer Abusamra, Southern Pines, NC (US); Ronald Peter Muetzel, Pinehurst, NC (US); James Henry DeVore, Laurinburg, NC (US); Robert Anthony Sayman, Laurinburg, NC (US)

(73) Assignee: ZF Meritor, LLC, Maxton, NC (US)

( * ) Notice: Subject to any disclaimer, the term of this patent is extended or adjusted under 35 U.S.C. 154(b) by 192 days.

(21) Appl. No.: 10/731,558

(22) Filed: Dec. 9, 2003

(65) Prior Publication Data

US 2005/0121284 A1    Jun. 9, 2005

(51) Int. Cl.
  *F16D 23/10* (2006.01)
  *F16D 43/24* (2006.01)
(52) U.S. Cl. .............. 192/105 C; 192/30 W
(58) Field of Classification Search ........... 192/103 R, 192/105 R, 105 C; 74/336 R; 477/80, 86
See application file for complete search history.

(56) References Cited

U.S. PATENT DOCUMENTS

| | | | |
|---|---|---|---|
| 2,914,131 A * | 11/1959 | Rist et al. ............. 180/273 |
| 4,081,065 A | 3/1978 | Smyth et al. |
| 4,131,036 A * | 12/1978 | Ivey et al. ............. 477/132 |
| 4,206,837 A * | 6/1980 | Brown et al. ............. 192/90 |
| 4,361,060 A * | 11/1982 | Smyth ............. 477/78 |
| 4,493,228 A * | 1/1985 | Vukovich et al. ............. 477/109 |
| 6,080,082 A * | 6/2000 | Steeby ............. 477/111 |
| 6,502,476 B2 * | 1/2003 | Genise ............. 74/336 R |
| 6,705,446 B2 * | 3/2004 | Drussel et al. ............. 192/83 |
| 2002/0134642 A1 | 9/2002 | Genise |
| 2002/0137595 A1 | 9/2002 | Markyvech et al. |
| 2002/0137596 A1 | 9/2002 | Markyvech |
| 2002/0137597 A1 | 9/2002 | Genise et al. |
| 2003/0106766 A1* | 6/2003 | Johnson et al. ............. 192/103 R |
| 2004/0132580 A1* | 7/2004 | Metzger et al. ............. 477/101 |

FOREIGN PATENT DOCUMENTS

| | | |
|---|---|---|
| DE | 831507 | 2/1952 |
| DE | 906 176 | 3/1954 |
| DE | 1104356 | 4/1961 |
| DE | 2743400 | 3/1979 |
| DE | 30 45 840 | 7/1982 |
| DE | 3226231 | 1/1984 |
| EP | 0668453 | 8/1995 |
| WO | WO 02/48530 | 6/2002 |

* cited by examiner

*Primary Examiner*—Saul Rodriguez
(74) *Attorney, Agent, or Firm*—Carlson, Gaskey & Olds

(57) ABSTRACT

A centrifugal clutch assembly includes a sleeve movable to selectively engage the clutch assembly independent of rotational speed. The clutch assembly includes centrifugal weights that move radially responsive to rotation of the clutch assembly. The centrifugal weights move pressure plates between clamped and open positions in response to a desired rotational speed. The sleeve is movable to selectively engage the pressure plate independent of rotational speed of the clutch assembly.

13 Claims, 4 Drawing Sheets

METHOD AND ASSEMBLY FOR CONTROLLING A CENTRIFUGAL CLUTCH

BACKGROUND OF THE INVENTION

This invention relates generally to a centrifugal clutch assembly, and specifically to a device and method for controlling a centrifugal clutch assembly.

Typically, a centrifugal clutch assembly includes a rotating input member such as a flywheel and one or more friction disks. The friction disks are forced against pressure plates that rotate with the flywheel. A plurality of centrifugal weights are pivotally mounted to rotate radially outward in response to rotation of the clutch assembly. As the rotational speed of the clutch assembly increases, rollers on the centrifugal weights cause clamping engagement between the pressure plates and the friction disks to transmit torque to the output shaft.

Disadvantageously, a centrifugal clutch assembly begins actuation only within a substantially fixed and limited range of engine speed. In some circumstances, it may be desirable to begin actuation of the clutch assembly outside this limited range. For example, when driving up a steep grade, or when launching the vehicle. Further, in some instances it is desirable to disengage the clutch assembly at an engine speed above normal disengagement speeds, such as when coasting or driving down a steep grade. Further, in some instances it is desirable to override automatic clutch operation to prevent a vehicle engine from stalling.

Accordingly, it is desirable to provide a centrifugal clutch assembly capable of operating outside of fixed rotational speed ranges.

SUMMARY OF THE INVENTION

The present invention is a centrifugal clutch assembly that includes a sleeve movable to selectively actuate the clutch assembly independent of rotational speed.

The clutch assembly includes centrifugal weights that move radially responsive to rotation of the clutch assembly. The centrifugal weights move pressure plates between a clamped and release position in response to a desired rotational speed. The sleeve is movable to selectively engage the pressure plate independent of rotational speed of the clutch assembly. A drive moves the sleeve axially to override control of clutch actuation by the centrifugal weights. The sleeve provides actuation of the clutch assembly at rotational speeds below those otherwise required to cause engagement with the centrifugal weights. Further, the sleeve provides for disengagement of the clutch at rotational speeds above the rotational speed at which the centrifugal weights actuate the clutch assembly.

This invention also includes a method of overriding an automatic clutch by manually disengaging the clutch assembly. The method includes the steps of monitoring operating inputs, and corresponding outputs. The operating inputs and outputs are compared and a fault indicated if the operating outputs fail to correspond to the operating inputs. In response to a fault, the system overrides automatic operation of the automated clutch assembly to prevent engine stall.

Accordingly, the centrifugal clutch assembly of this invention provides for operation outside of fixed rotational speeds.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
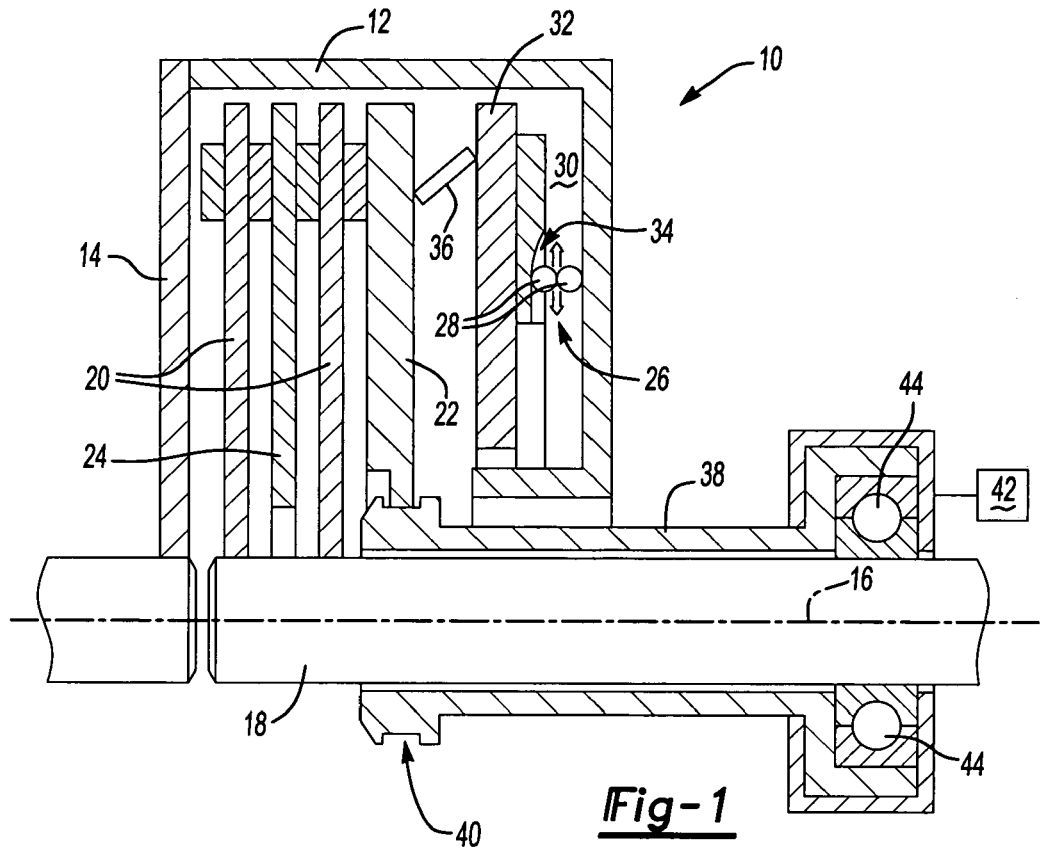
FIG. 1 is a schematic illustration of a centrifugal clutch assembly including a manually override sleeve in a normal operating position.

Referring to FIG. 1, a centrifugal clutch assembly 10 is schematically shown. The clutch assembly 10 includes a clutch cover 12 fixed to a flywheel 14. The flywheel 14 and clutch assembly 10 rotate about an axis 16 to transmit torque to an inputoutput shaft 18. The clutch assembly 10 includes friction disks 20 that are rotatable to drive the output shaft 18. First and second pressure plates 22, 24 move axially to clamp the friction disks 20. A centrifugal weight 26 includes rollers 28 that move within a space 30 defined between a front plate 32 and the clutch cover 12. The front plate 32 includes a ramped surface 34 on which the rollers 28 move to drive the front plate 32 axially.

Rotation of the clutch assembly 10 creates a centrifugal force that drives the centrifugal weight 26 radially outward along the ramped surface 34. Radial movement of the centrifugal weight 26 moves the front plate 32 axially. Axial movement of the front plate 32 compresses a clamp spring 36 that forces the pressure plates 22, 24 into clamping engagement with the friction disks 20. Movement of the front plate 32 between clamped and open positions is dependent on the centrifugal force developed by rotation of the clutch assembly 10.

The clutch assembly 10 is designed to begin actuation at a desired rotational speed. The desired rotational speed of actuation is determined by the configuration of the centrifugal weight 26 and the front plate 32. A worker skilled in the art would understand how to configure the front plate 32 and the centrifugal weight 26 to cause clutch actuation at a desired rotational speed. The range at which the clutch assembly 10 engages and disengages is substantially fixed. In some instances it is desirable to actuate the clutch assembly 10 outside of the fixed range.

The clutch assembly 10 of this invention includes a sleeve 38 engaged to the first pressure plate 22. The sleeve 38 includes an annular groove 40 within which a portion of the first pressure plate 22 is received. The sleeve 38 is slideable along the output shaft 18 to move the first pressure plate 22 axially independent of the front plate 32 and clamp spring 36.

A drive 42 is provided to move the release sleeve 38 along the output shaft 18. The drive 42 may include any device known to a worker skilled in the art such as a hydraulic or pneumatic cylinder, electric motor or a mechanical linkage providing manual actuation. The sleeve 38 includes bearings 44 that ride on the output shaft 18. Preferably, the sleeve 38 remains stationary relative to rotation of the output shaft 18.

During normal automatic clutch operation, where the centrifugal weights 26 control engagement of the clutch assembly 10, the sleeve 38 moves with the first pressure plate 22. The pressure plates 22, 24 clamp the friction disks 20 to begin transmitting torque to the output shaft 18. The clutch assembly 10 begins actuation at a substantially fixed rotational speed, and also disengages or opens in response to a decrease in rotational speed below the engagement speed.

When different clutch engagement characteristics are desired, the sleeve 38 is actuated to selectively engage the clutch assembly 10 independent of rotational speed. FIG. 1, schematically illustrates the normal actuation of the clutch assembly 10 caused by radial movement of the centrifugal weights 26. The sleeve 38 moves axially with the first pressure plate 22 in response to movement of the front plate 32.

Figure 2:
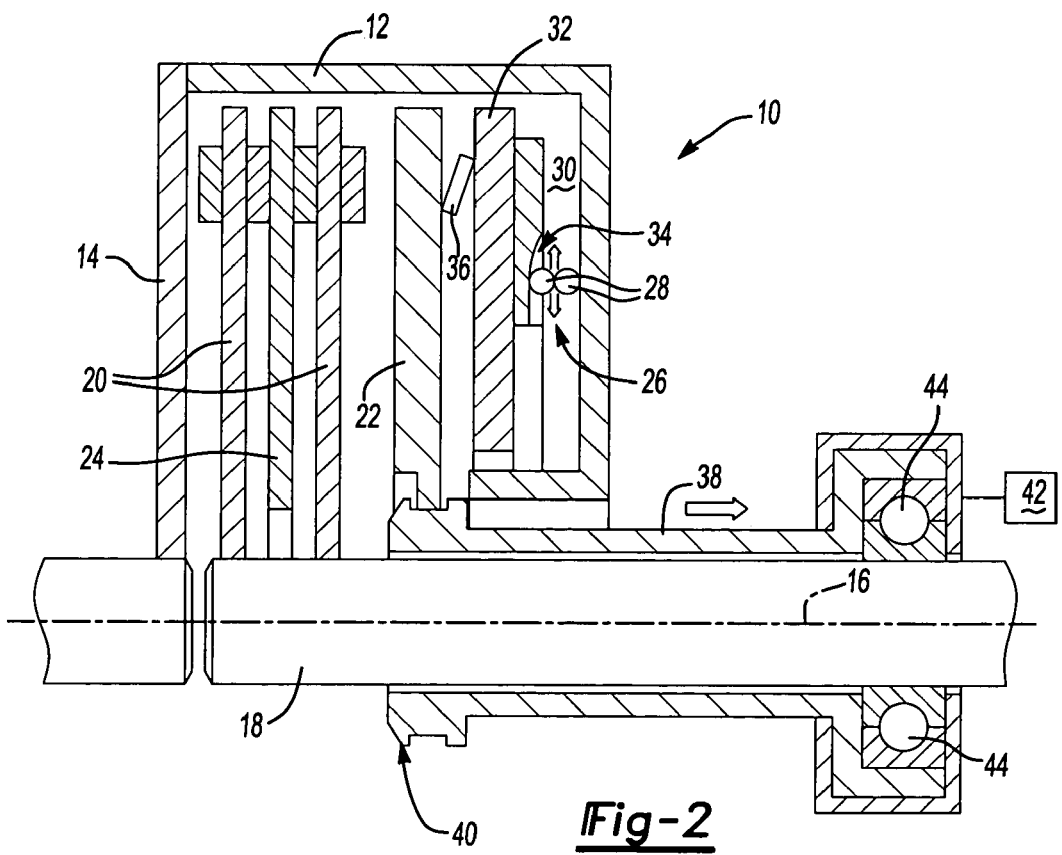
FIG. 2 is a schematic illustration of the centrifugal clutch assembly with the sleeve in a position to override operation of centrifugal weights.

Referring to FIG. 2, the sleeve 38 is schematically illustrated overriding the centrifugal weights 26 to disengaged clutch actuation. The drive 42 moves the sleeve 38 axially to disengage the first pressure plate 22 from the friction disks 20 to release the clutch. The sleeve 38 moves the pressure plate 22 rearward against the biasing force of the clamp spring 36 to disengage the clutch. Movement of the sleeve 38 overrides the position of the centrifugal weights 26 to provide control of the clutch assembly 10 outside the substantially fixed range of actuation provided by the centrifugal weights 26.

Figure 3:
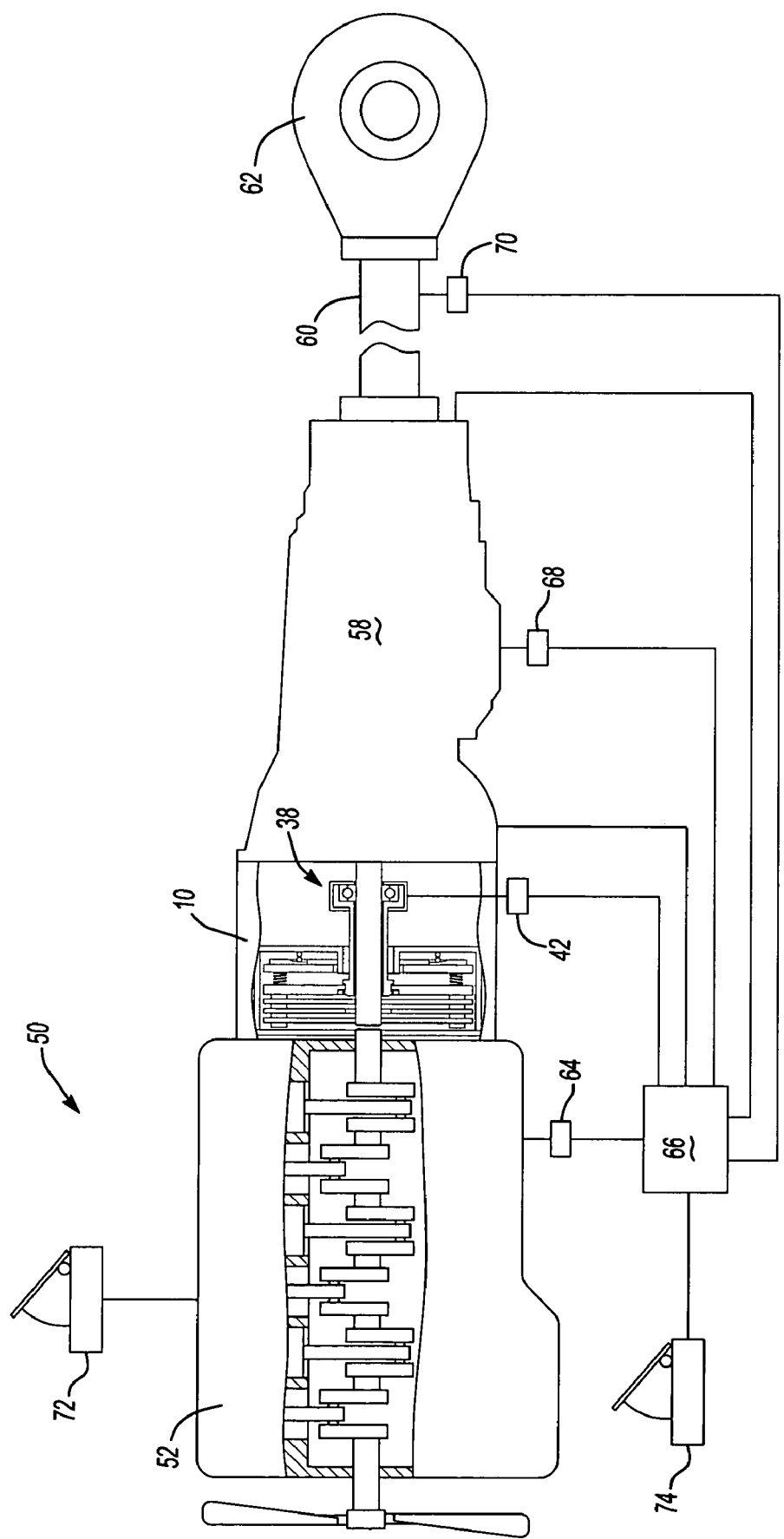
FIG. 3 is a schematic illustration of a drive train including the clutch assembly according to this invention.

This invention includes a method of preventing engine stall by disengaging an automatic clutch in response to detected inputs. FIG. 3 is a schematic illustration of a vehicle drive train 50 including an engine 52 coupled to a transmission 58 by the clutch assembly 10. The transmission 58 drives a drive shaft 60 that in turn drives a drive axle 62.

Operating conditions of the vehicle drive train 50 are monitored by an engine sensor 64, a transmission sensor 68 and a driveline sensor 70. Further, a throttle position sensor 72, and brake position sensor 74 provide information on input from an operator. Each of the sensors 64,68,70, 72, 74 may be of any configuration known in the art for monitoring operating conditions of the vehicle drive train 50. The sensors 64, 68, 70, preferably monitor rotational speed of the various components of the drive train 50 and provide that information to the vehicle controller 66. Although preferably, rotational speed is monitored, it is within the contemplation of this invention to use other sensors as are known to a worker skilled in the art. For example, environmental conditions such as inertia brake position, vehicle load conditions, throttle position, current transmission gear ratio and engine operating parameters can be monitored to provide information on current operating conditions.

During operation of the drive train 50, the clutch assembly 10 may not disengage in response to inputs that would normally cause disengagement. For example, reduction in engine speed below that required to move a vehicle. In such instances, the sleeve 38 is actuated to override automatic operation of the clutch assembly 10 and stop transmission of torque to the drive axle 62, releasing the coupling with the engine 52 to prevent stalling.

In operation, the controller 66 monitors information gathered from the sensors 64, 68, 70, 72, and 74. The monitored information received from the sensors 64, 68, 70, 72, and 74 provides information indicative of vehicle operation. The sensors 72 and 74 monitor input to the drive train 50, such as the throttle position and the brake pedal position and the sensors 64,68,70 monitor output of the drive train 50 such as engine speed or transmission output speed. The inputs are compared to the outputs. Drive train output corresponds to input information within a predefined range indicative of desired vehicle operation. If the output information does not properly correspond with input information, a fault is detected and the controller 66 actuates the sleeve 38 to open the clutch assembly 10 and prevent the engine 52 from stalling.

Figure 4:
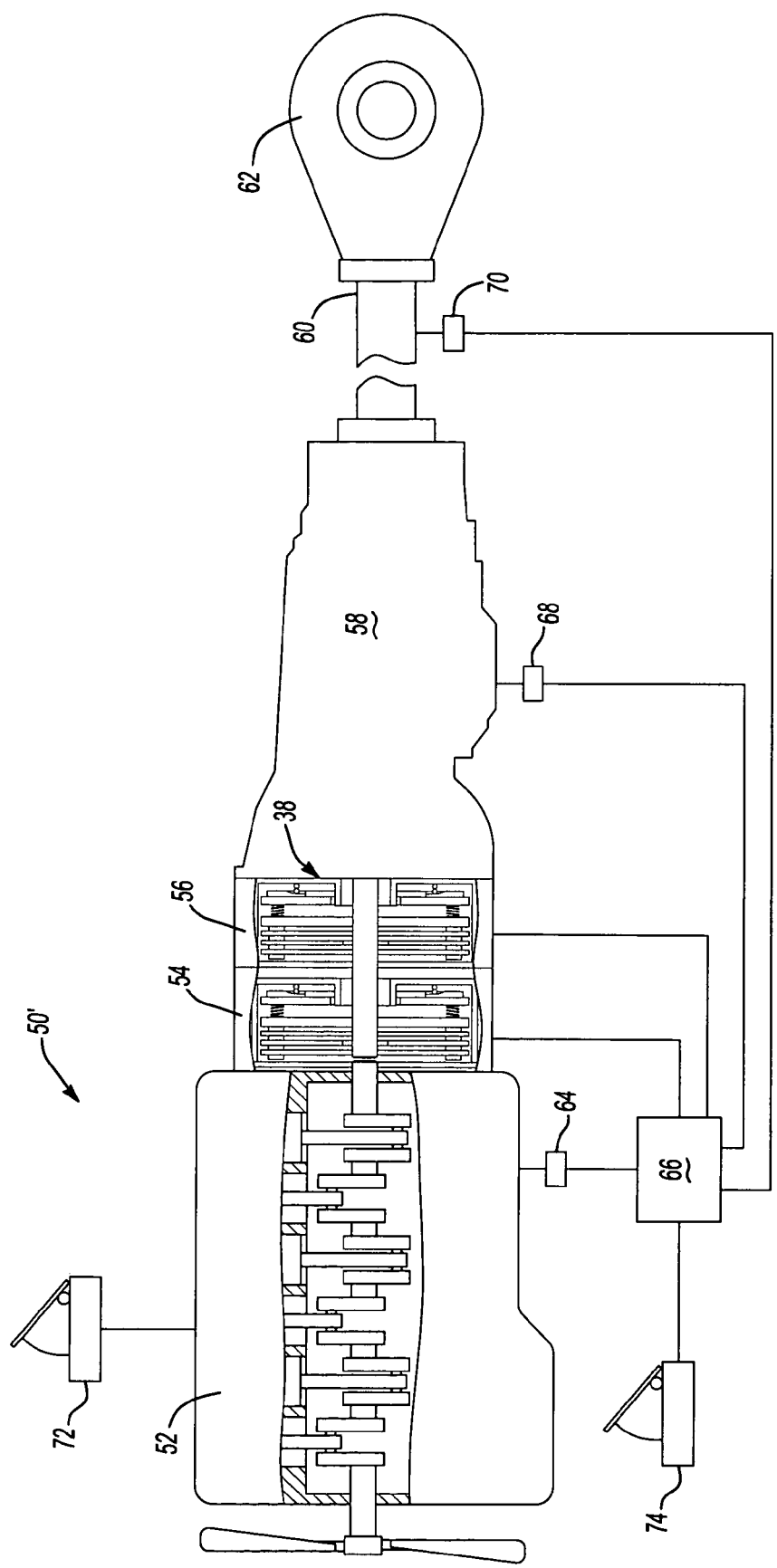
FIG. 4 is a schematic illustration of a drive train including a second clutch assembly.

Referring to FIG. 4, another method according to this invention is shown and includes a drive train 50' that includes first and second clutch assemblies 54, 56. The second clutch assembly 56 is shown coupled between the first clutch assembly 54 and the transmission 56. However, the second clutch assembly 56 may be disposed anywhere within the drive train 50' to provide a secondary means of decoupling the engine 52 from the drive axle 62 to prevent engine stall.

During operation of the drive train 50', the first clutch assembly 54 may not disengage in response to inputs that would normally cause disengagement. For example, reduction in engine speed below that required to move a vehicle. In such instances, the second clutch assembly 56 is opened to stop transmission of torque to the drive axle 62, releasing the coupling with the engine 52 to prevent stalling.

In operation, the inputs are compared to the outputs. Drive train output corresponds to input information within a predefined range indicative of desired vehicle operation. If the output information does not properly correspond with input information, a fault is detected and the controller 66 will actuate second clutch assembly 56 to counter the fault and prevent the engine 52 from stalling.

Figure 5:
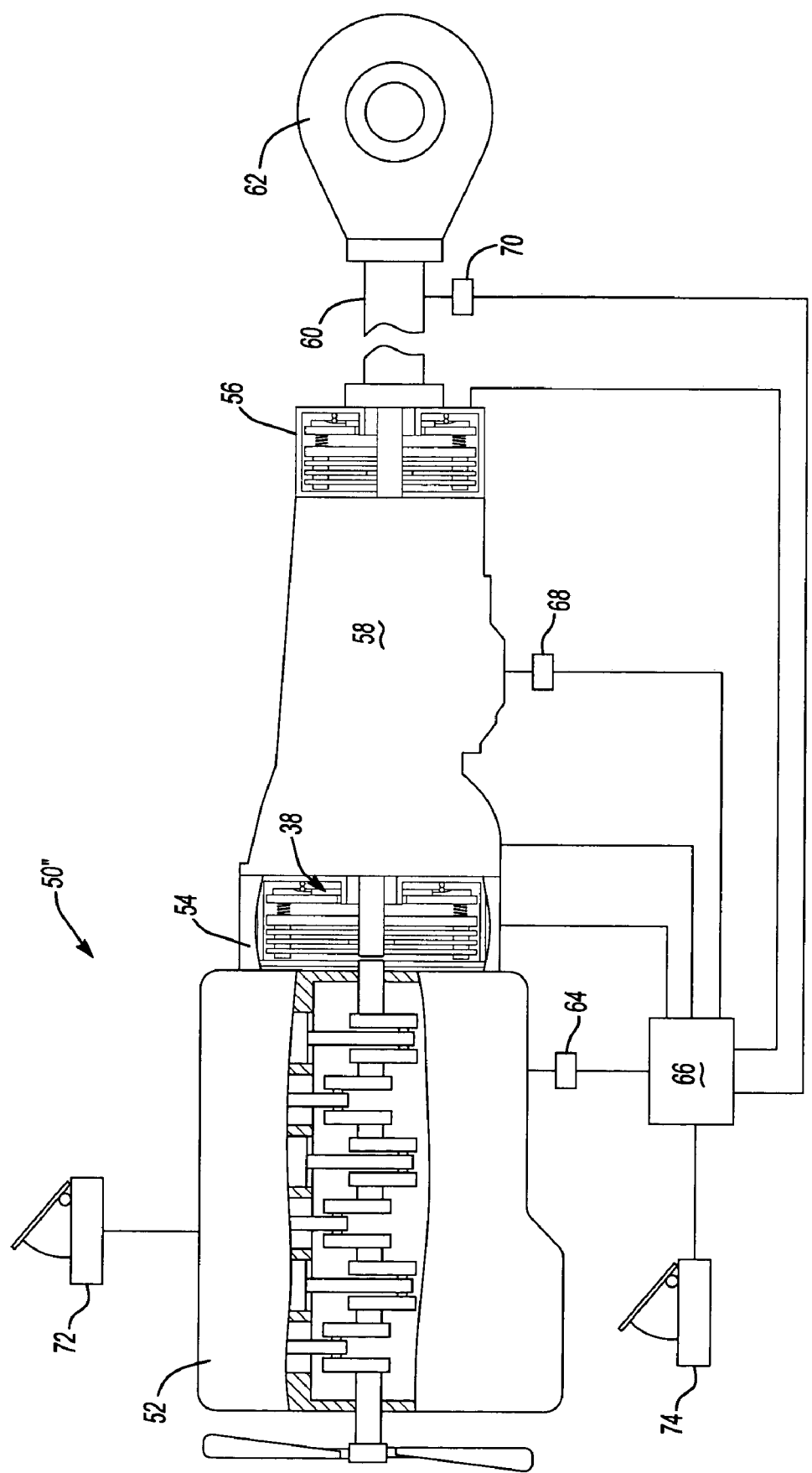
FIG. 5 is a schematic illustration of another drive train assembly with a second clutch assembly.

Referring to FIG. 5, a vehicle drive train 50" includes the second clutch assembly 56 positioned between the transmission 58 and the drive shaft 60. Although preferably the second clutch assembly 56 is positioned adjacent the first clutch assembly 54, other locations within the drive train 50 are within the contemplation of this invention and a worker skilled in the art with the benefit of this disclosure would understand the possible alternate location for the second clutch assembly 56. Further, a worker with the benefit of this disclosure would understand that multiple clutch assemblies can be disposed throughout the drive train 50.

The clutch assembly and method of this invention provide for the overriding of automatic operation of a centrifugal or automatically actuated clutch assembly to modify actuation and accommodate operating conditions outside fixed operating parameters.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of controlling a centrifugal clutch assembly comprising the steps of:
   a) monitoring vehicle operating inputs;
   b) monitoring vehicle operating outputs;
   c) detecting a fault condition responsive to monitored vehicle operating outputs being outside of a desired range relative to monitored vehicle operating inputs; and
   d) disengaging transmission of torque by opening the centrifugal clutch assembly responsive to a detected fault condition at a speed greater than a speed required to engage the centrifugal clutch assembly.

2. The method as recited in claim 1, wherein the centrifugal clutch assembly comprises a plurality of weights movable radially outward responsive to rotation to begin actuation of the centrifugal clutch assembly, and said step d) further comprises overriding the plurality of weights to open the centrifugal clutch assembly.

3. The method as recited in claim 1, comprising a second clutch assembly, and said step d) comprises opening the second clutch assembly.

4. The method as recited in claim 1, wherein one of the vehicle operating inputs comprises a throttle position.

5. The method as recited in claim 1, wherein one of the vehicle operating inputs comprises engine speed.

6. The method as recited in claim 1, wherein one of the vehicle operating inputs comprises brake pedal position.

7. The method as recited in claim 1, wherein one of the vehicle operating outputs comprises centrifugal clutch assembly position.

8. The method as recited in claim 2, wherein the plurality of weights are movable radially responsive to rotation of the centrifugal clutch assembly to move a pressure plate axially toward an engaged position and said step d) further comprises moving the pressure plate toward an open position independent of a radial position of the plurality of weights.

9. The method as recited in claim 8, wherein said step d) comprises engaging a sleeve to the pressure plate and moving the pressure plate from a clamped position to the open position.

10. A method of controlling a centrifugal clutch assembly comprising the steps of:

a) moving a pressure plate axially toward an engaged position responsive to radial movement of a plurality of weights caused by rotation of the centrifugal clutch assembly above a desired speed;

b) engaging at least one friction plate with the pressure plate to transmit torque to an output shaft;

c) monitoring at least one vehicle output with respect to vehicle inputs; and d) overriding engagement of the pressure plate and friction plate at a speed greater than or equal to the desired speed by moving the pressure plate axially away from the engaged position responsive to the at least one vehicle output being outside a desired range with respect to the vehicle inputs.

11. The method as recited in claim 10, including the step of detecting a condition indicative of stalling of an engine that is driving the centrifugal clutch assembly and overriding engagement to prevent the engine from stalling.

12. The method as recited in claim 10, including moving the pressure plate axially away from the engaged position with a sleeve movable axially along an axis of rotation.

13. The method as recited in claim 10, including moving the pressure plate axially toward an engaged position at a speed below the desired speed such that the pressure plate engages the at least one friction plate to transmit torque at a speed below the desired speed that causes actuation by radial movement of the plurality of weights.

* * * * *

UNITED STATES PATENT AND TRADEMARK OFFICE
CERTIFICATE OF CORRECTION

PATENT NO. : 7,232,021 B2  
APPLICATION NO. : 10/731558  
DATED : June 19, 2007  
INVENTOR(S) : Abusamra et al.

Page 1 of 1

It is certified that error appears in the above-identified patent and that said Letters Patent is hereby corrected as shown below:

ON THE TITLE PAGE:

Inventor Muetzel should read as follows:

(75) Ronald Peter Muetzel, Friedrichshafen, BW, GERMANY

Signed and Sealed this

Twenty-first Day of August, 2007

JON W. DUDAS  
*Director of the United States Patent and Trademark Office*